Jan. 26, 1965   H. A. TOULMIN, JR   3,167,656
PHOTOELECTRIC MACHINE TOOL CONTROL
Filed Aug. 10, 1960   3 Sheets-Sheet 1
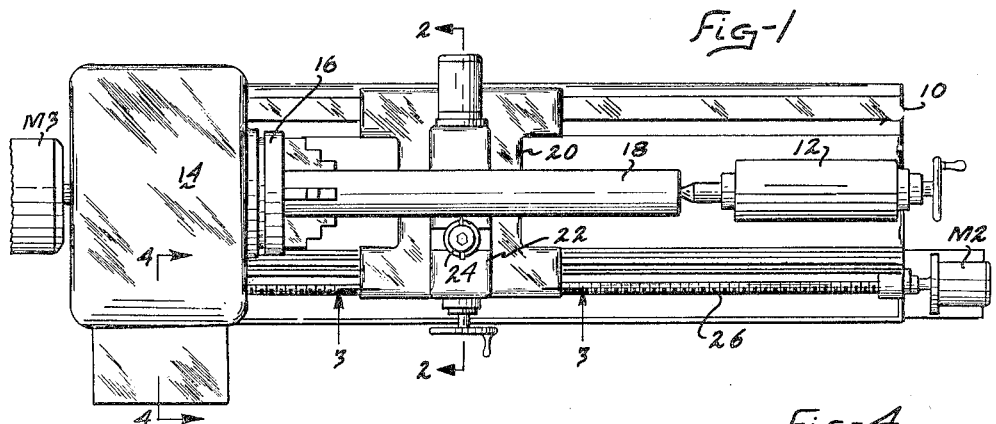
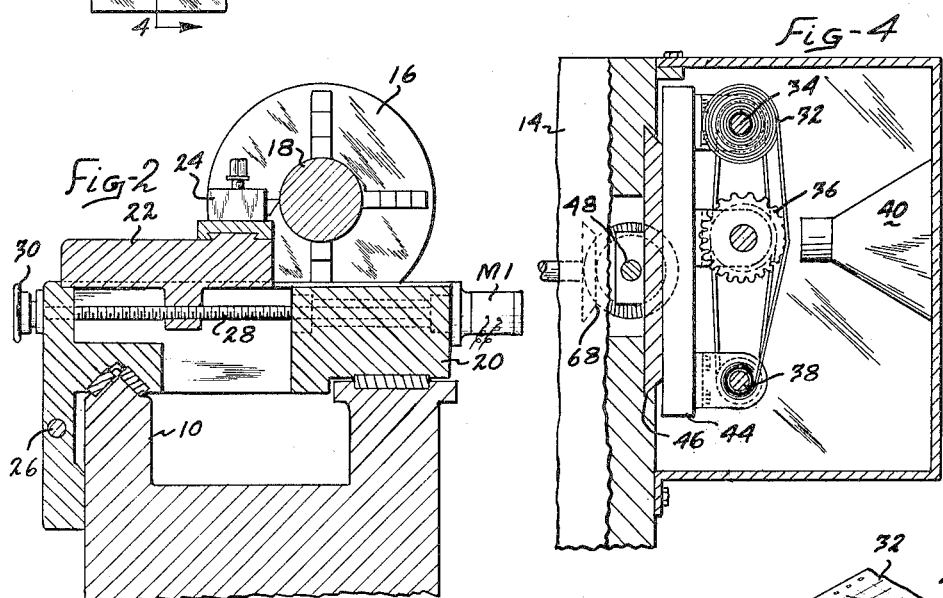
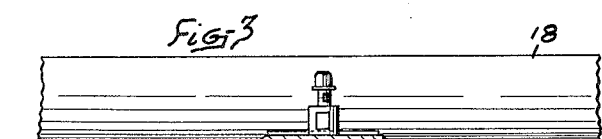
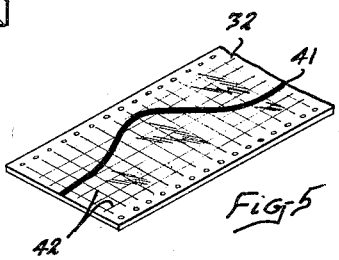
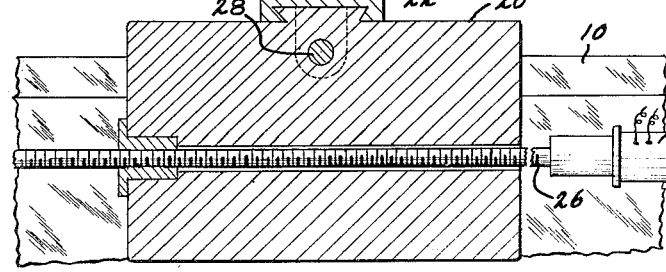
INVENTOR.
HARRY A. TOULMIN JR.
BY Toulmin & Toulmin
ATTORNEYS

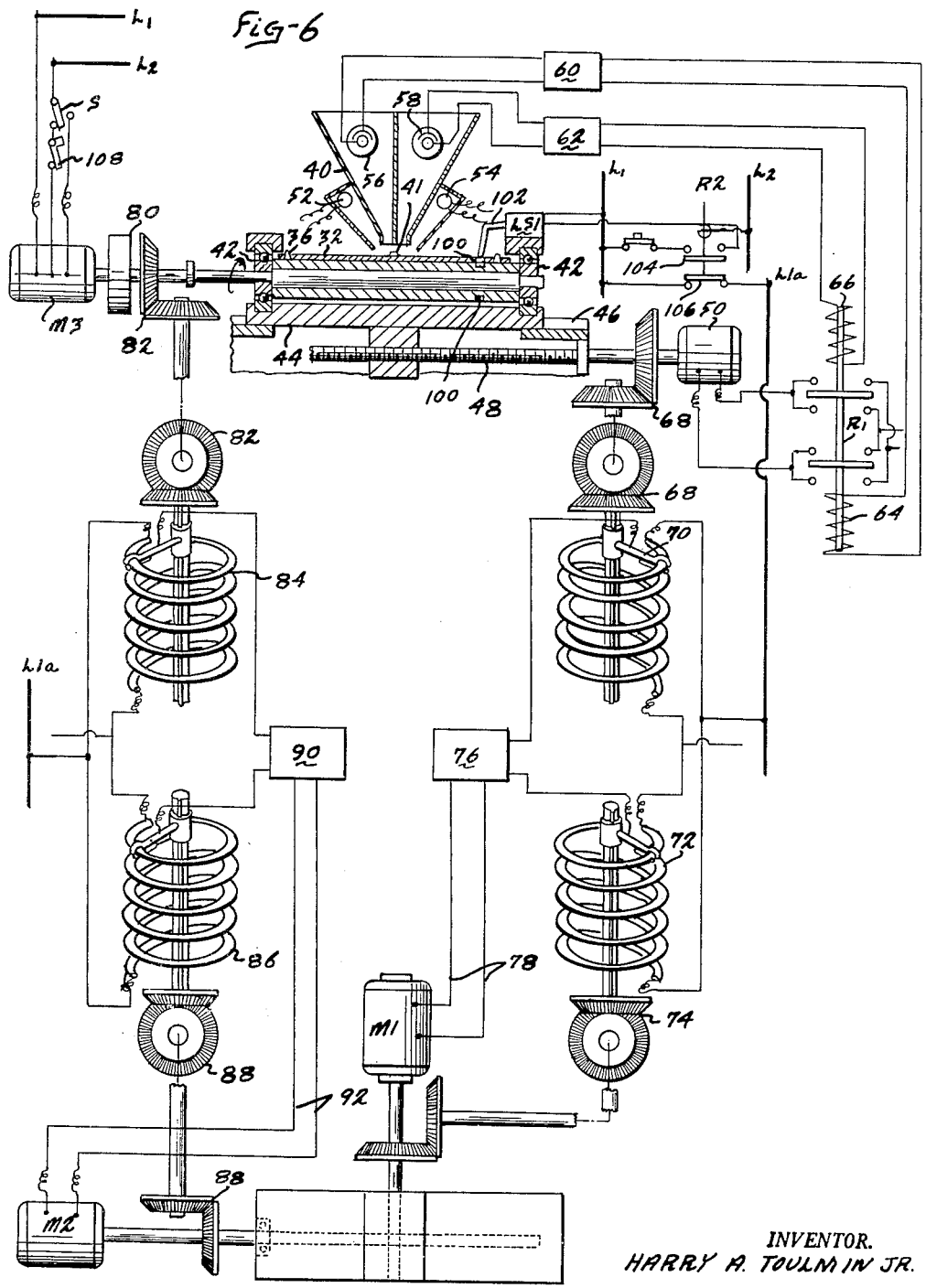

Jan. 26, 1965     H. A. TOULMIN, JR     3,167,656

PHOTOELECTRIC MACHINE TOOL CONTROL

Filed Aug. 10, 1960     3 Sheets-Sheet 3

INVENTOR.
HARRY A. TOULMIN JR.
BY Toulmin & Toulmin
ATTORNEYS

United States Patent Office 3,167,656
Patented Jan. 26, 1965

3,167,656
PHOTOELECTRIC MACHINE TOOL CONTROL
Harry A. Toulmin, Jr., Dayton, Ohio, assignor to The Commonwealth Engineering Company of Ohio, Dayton, Ohio
Filed Aug. 10, 1960, Ser. No. 48,763
7 Claims. (Cl. 250—202)

This invention relates to machine tools and is particularly concerned with a turning machine such as lathe or the like and most especially is concerned with a method and apparatus for effecting the automatic control of such a machine so that work pieces can be turned and contoured without any attention from the operator other than to put the work pieces in the machine, adjust the controlling mechanism, and start the machine.

Automatically controlled machine tools such as lathes are known and, generally, the automatic control is in the form of a template or a punched tape or the like by means of which the longitudinal feed, and cross feed, and spindle control and any other variables of this nature are regulated. With template control, it is necessary for there to be a relatively expensive and accurate template constructed and this template must be supported accurately in position on the machine tool and followed with an accurate follower between which and the cutting tool being controlled there is a servo motor mechanism.

With punched tape or punched card controls, an elaborate computer mechanism is required for reading the punched control member and for translating this information into units of cross-feed and longitudinal feed and spindle speed in order to contour the work piece. Such systems are extremely expensive and are not readily available to the ordinary machine tool owner.

Having the foregoing in mind, it is a primary object of the present invention to provide a control arrangement for a machine tool such as a lathe in which the control member can be relatively simply arrived at and easily mounted in the machine and thereafter automatically control the machine operation, all without the use of expensive mounting and supporting equipment or expensive computing mechanisms.

A still further object of this invention is the provision of a method and apparatus for effecting the automatic control of machine tools and the like in which the control member consists of a chart having a line thereon, which can be drawn on in the drafting room by the draftsman from instructions given by the engineer or designer, and this control member placed directly in the machine tool to effect control thereof.

A still further object is the provision of a method and apparatus for the nature referred to in which all of the variables in a machine tool such as a lathe can readily be controlled.

These and other objects and advantages of this invention will become more apparent upon reference to the following specification taken in connection with the accompanying drawings in which:

FIGURE 1 is a plan view looking down on top of a lathe embodying one form of the present invention;

FIGURE 2 is a sectional view indicated by line 2—2 on FIGURE 1 showing the cross slide on which the cutting tool is mounted;

FIGURE 3 is a longitudinal section indicated by line 3—3 on FIGURE 1 showing the drive to the carriage of the machine;

FIGURE 4 is a sectional view indicated by line 4—4 on FIGURE 1 showing the manner of driving the control member during the operation of the machine;

FIGURE 5 is a diagrammatic perspective view showing the form which the control member or chart takes;

FIGURE 6 is a diagrammatic representation of the electric control circuit by which the machine is operated and which is under the control of the chart;

Figure 7:
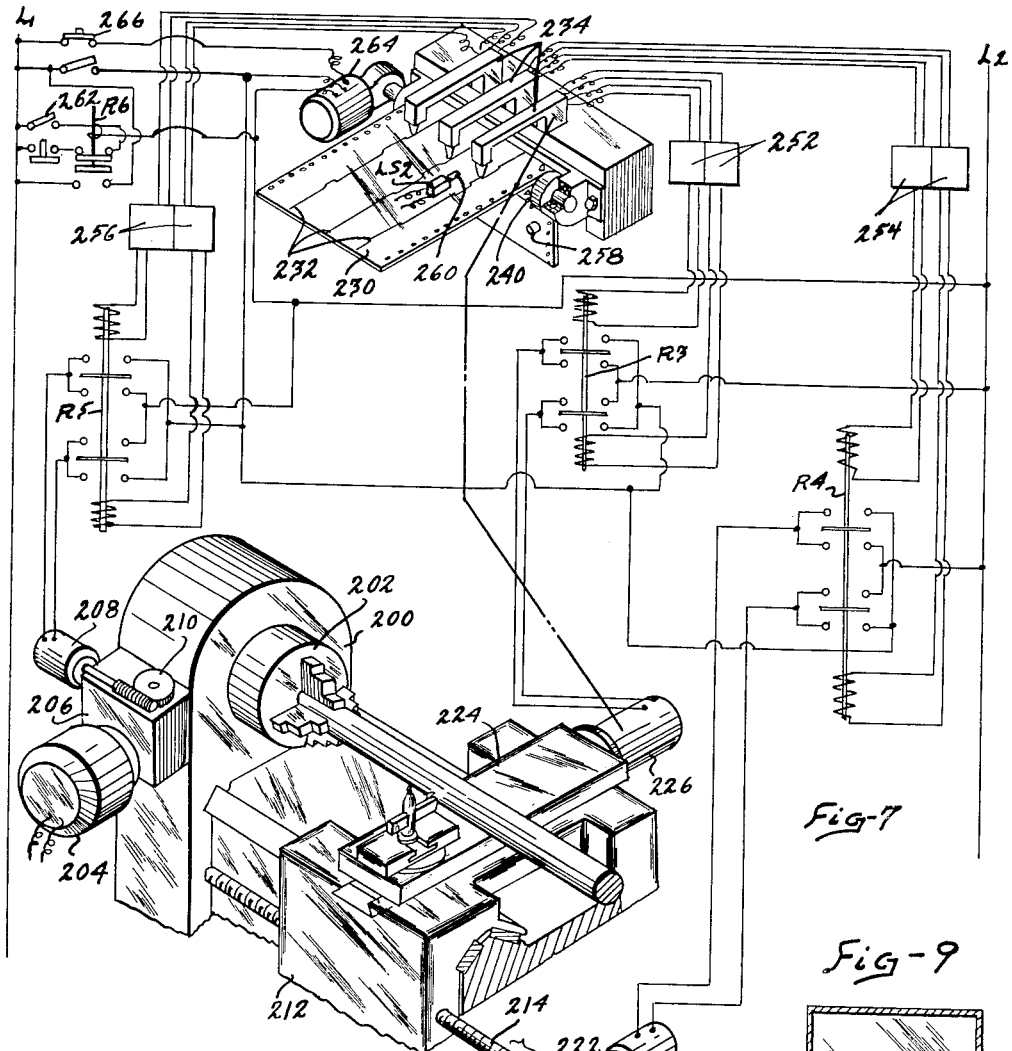
FIGURE 7 is a diagrammatic perspective view showing a modified arrangement according to this invention.

Referring to the drawings somewhat more in detail in FIGURE 1 is shown a lathe having a bed 10 with tail stock 12 and a head stock 14 that includes the rotatable spindle 16 between which spindle and the tail stock is supported for rotation on the work axis of the lathe a work piece 18.

Longitudinally movable along the lathe bed is a carriage 20 that includes a cross slide 22 that carries a cutting tool 24 for operating the work piece. The carriage is movable longitudinally of the bed by a lead screw 26 having a reversible, preferably, variable speed motor M2 connected therewith.

The cross slide 22 is engaged by a screw 28 which is also driven by a reversible and preferably variable speed motor M1. Manual means such as the hand wheel 30 are also provided for rotating screw 28.

The spindle is driven by a motor M3 which may also be utilized for driving the control member according to the present invention.

Reference to FIGURE 4 will show that the control member is in the form of an elongated tape or chart 32 which feeds from a supply reel 34 over a pin wheel drive member 36 to a take up reel 38. This tape or chart is scanned at a scanning station 40 and the machine tool control is effected thereby.

It will be noted in FIGURE 5 that the tape or chart 32 has a line 41 inscribed thereon which may be done by a draftsman by plotting the line out on the cross section lines 42 which are printed on the tape but which are of such a color as to be invisible to the scanning head.

The control circuit is more or less diagrammatically illustrated in FIGURE 6 wherein it will be seen that the pin wheel drive member 36 is in the form of a roller supported on the bearings 42 in a frame 44 that is laterally moveable on the guide means 46. The direction of movement of the roller and, therefore, of the chart or control member is laterally of the control member but in the axial direction of the roller 36.

A screw 48 engages the carriage for the purpose of so moving the frame and this screw is connected with a motor 50 for being driven thereby.

The pin wheel member 36 itself is drivingly connected with a drive motor, such as the spindle motor M3, for being driven thereby. The scanning unit 40 is shown in sections in FIGURE 6 and will be seen to comprise a pair of light sources 52 and 54 which illuminate the chart in the region of the line 41 thereon so that reflection of light from the surface of the chart passes upwardly into the housing and activates the photocells 56 and 58. It will be appreciated that either the surface of the chart is non-reflective or else the line 41 thereon is non-reflective so that the illumination of the photocells is a direct indication of whether or not the line 41 is drifting one way or the other relative to the scanning mechanism. The circuit arrangement is such that whenever the line departs from a neutral position under the scanning mechanism, restoring influences are initiated to return the line to its neutral position by means of laterally reciprocating the frame in which the pin wheel drive member 36 is mounted.

This is accomplished by connecting each of photocells 56 and 58 to the amplifiers 60 and 62, respectively, the outputs of which are connected with the control coils 64 and 66, respectively, of the normally centered reversing relay R1 which is connected with motor 50. This arrangement is such that when the relay is de-energized the motor 50 is de-energized and when the relay coil 64 is energized motor 50 runs in one direction and when coil 66 is energized motor 50 runs in the opposite direction. By this means motor 50 maintains the line 41 on the chart in the neutral position.

Motor 50 is also connected by way of gearing 68 with the movable arm 70 of a helically wound potentiometer or rheostat, referred to in the art as a "helipot." The opposite ends of this helipot are connected with the opposite ends of a similar helipot 72 also having a movable arm with the two arms of the helipot being connected to the input of an amplifier and reversing relay arrangement similar to that associated with the photocells 56 and 58. This amplifier in reversing relay re-arrangement 76 has terminals connected by wires 78 with the reversible, and preferably variable speed motor M1 which drives the cross slide screw. This motor is connected through gearing 74 with the shaft on which the movable arm of helipot 72 is mounted.

The motor M3, which drives the pin wheel drive member 36, it has been mentioned, may be the spindle motor and in which case it is connected through reduction gearing 80 with the shaft leading to the pin wheel drive member. This may also be a separate motor however in this modification and entirely separate from the spindle motor.

In any case the motor is connected through the gearing 82 with the shaft which drives the movable arm of a helipot 84 corresponding to the previously mentioned helipots. The opposite end terminals of the stationary part of this helipot are connected with the corresponding terminals of another helipot 86 and the movable arms of the two helipots are connected to supply an amplifier and reversing relay arrangement 90 similar to those previously referred to and which has output terminals connected by wires 92 with the terminals of the reversible, and preferably variable speed, motor M2 that is connected to the longitudinal lead screw 26. This motor M2 is also connected through the gearing 88 with the shaft on which the movable arm of helipot 86 is mounted.

The arrangement is such that any deviation of the line 41 on the chart member 32 from a neutral position wherein both of the photocells 56 and 58 are equally illuminated, will cause restoring forces to be set up to move the chart laterally to restore the lines to its neutral position. This operation will be accompanied by movement of motor M1 so that the cross slide will track the lateral movement of the chart. At the same time the longitudinal movement of the chart as determined by motor M3 will be accompanied by longitudinal movement of the carriage since motor M2 will track motor M3 through the described helipot-amplifier-reversing relay arrangement.

It will be evident that, because of the circuit connections described above, the outline of a workpiece to be turned can be drawn on the chart 32, and when this chart is placed in the machine and the machine activated and the chart moved, the machine will trace the drawn outline on the workpiece being cut.

In order to bring the turning operating to a halt when the chart reaches its end position, the chart at the end is provided with an aperture 100 which is positioned over a groove 101 in the pin wheel roller 36. Resting on the surface of the chart is a finger 102 which is the actuating element for a limit switch LS1. The switch LS1 has one normally open and one normally closed blade which are actuated when the finger 102 drops in aperture 100.

When this occurs the normally open blade of switch LS1 closes and energizes the coil of a relay R2 which closes a blade 104 which serves as a holding circuit for the relay. The relay also opens the blade 106 that interrupts the circuit from power line L1 to power line L1a which latter is one of the power lines which provides power to the motors M1 and M2. Closing of relay R2, accordingly, interrupts the operation of the motors M1 and M2.

The normally closed blade of switch LS1 opens at the time finger 102 drops through the aperture and this blade, which is indicated at 108, is inserted in circuit with motor M3 so that motor M3, which is either the spindle motor, or an individual motor for driving the chart longitudinally will also come to a halt. At this time, the reversing switch S is operated and this reverses motor M3 to wind the chart back to its starting position and which will also return the movable arm of helipot 84 to its starting position. Thereafter, the operator resets the machine tool back to the starting position, and a new workpiece can be put in the machine and operated in the same manner as before.

It will sometimes occur that the length of the chart is short enough that it can hang in a loop on the roller 36 so that when it reaches its end point and the machine is halted, it is not necessary to reverse motor M3 but, instead, the cross slide and carriage are returned to their starting position, and the chart is then advanced to its starting position and another work operation can be carried out. This will eliminate the winding up of the chart and permits repetitive operations to be carried out efficiently and rapidly.

In any case, however, it is desirable for there to be a stopping position so that the machine will operate substantially without the attention of an operator and will come to a halt at the proper time.

If the machine is provided with a mechanism for automatically discharging the operated workpiece and reloading the machine with a new workpiece to be operated, there can also be provided a mechanism for resetting the carriage and cross slide and the chart so that completely automatic operation of the machine tool can be had by the practice of the present invention.

In the modification described above, the control of the longitudinal movement of the carriage and the cross slide has been effected with it being necessary for the carriage to run continuously. Because the carriage must run in the same direction, certain types of workpieces cannot be operated by the first described modification. For example, workpieces having re-entrant surfaces of a certain type thereon cannot be operated in the arrangement of the first modification satisfactorily, although the cross slide could be positioned at an angle and in this manner permit the forming of some such surfaces.

However, a particular class of cutting operations that cannot be carried out in the first modification is that of forming threads because this requires accurate synchronization of the speed of rotation of the spindle and the speed of the longitudinal feed of the carriage.

Figure 8:
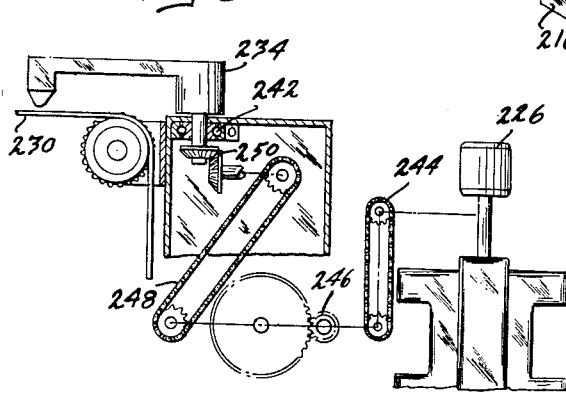
FIGURE 8 is a sectional view showing the mounting of one of the scanning arms and its connection with control elements of the circuit.
Figure 9:
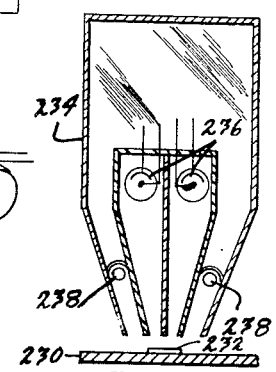
FIGURE 9 is a sectional view through the scanning end of one of the swinging arms of the reader of FIGURE 7.

The modification of FIGURES 7, 8 and 9 overcomes this defect by providing such control elements in the circuit thereby making the control arrangement of the present invention fully effective for all classes of turning operations.

Referring now to FIGURES 7, 8 and 9, in FIGURE 7 there is a machine tool 200 having a rotary spindle 202 that supports a workpiece to be operated. This spindle is driven by a motor 204 through a variable speed transmission 206 which may also be reversible. A reversible motor 208 adjusts the transmission by way of the gearing 210 so that any desired spindle speed can be obtained.

The carriage 212 of the machine which slides along the bed thereof is driven by screw 214 which is connected through the variable reversible transmission 216 with a motor 218. An adjusting motor 220 is connected through gearing 222 with the control element of the transmission so that reversible energization of motor 220 will serve to adjust the transmission to any desired speed ratio between the motor and the screw.

The cross slide 224 also has a reversible drive motor 226 so that the cross slide can be moved inwardly and outwardly as desired. It will be understood that the cross slide 224, as in the case of the first modification, could be mounted on a swivel so as to move angularly to the work axis if so desired which would readily permit the turning of re-entrant surfaces and the like where this was necessary.

The control of the machine tool according to this invention is effected by a chart member 230 having three lines 232 drawn thereon which are followed by the arms 234. Each arm has a scanning end arranged as illustrated in FIGURE 9 with a pair of photocells 236 and a pair of light sources 238 which direct illumination to the chart so that reflection from the chart will illuminate the cells. Instead of the chart being driven in such a manner that it is laterally movable as in the first modification, the chart in the instant modification is driven by a pin wheel drive member 240 which is not laterally movable. Instead, each of the arms 234 is pivotally supported on a bearing 242 as illustrated in FIGURE 8 so that the arms swing over the chart rather than the chart moving laterally thus giving a great deal more latitude to the nature of the configurations that can be placed upon the chart.

FIGURE 8 illustrates one of the arms which is arranged for controlling the cross slide motor 226 and will be seen that the cross slide motor is connected backwardly through the chain 244, reduction gearing 246 and a second chain drive 248 and the bevel gears 250 so that as the cross slide motor operates, the arm 234 will swing. This effects the restoring movement that is necessary for an arrangement of this nature.

Electrical connections between the arm 234 for motor 236 are as illustrated in FIGURE 7 where it will be seen that the photocells pertaining to that particular arm are connected through the amplifier means 252 for reversible energization of a normally centered relay R3 which is adapted for reversibly energizing motor 226, or, when centered, for de-energizing the said motor.

The movable arm pertaining to adjusting motor 220 for the transmission connecting motor 218 with lead screw 214 is similarly connected through amplifiers 254 with a reversing relay R4 that controls the reversible energization of motor 220.

The arm for the spindle motor for adjusting the speed of the spindle motor is likewise connected through amplifiers 256 with a reversing relay R5 so that motor 208 is controlled to adjust its pertaining transmission.

Similarly to the first described modification the chart 230 is provided with a stopping aperture 258 into which the finger 260 of the limit switch LS2 is adapted for dropping. This limit switch has a normally open blade shown at 262 which, upon closing, will energize a relay R6 which will close one blade to establish a holding circuit and will open a second blade so that the drive motor 264 attached to the pin wheel drive member 240 will be de-energized to bring the chart to a halt. This relay also interrupts the energization circuit to the several motors of the machine tool so that the entire machine tool will also come to a halt. Thereafter, the cross slide and carriage of the machine tool may be returned to their starting positions while a switch 266 may be availed out for reversing motor 264 thereby to rewind the chart, unless it is possible for the chart to hang in a loop about the pin wheel drive member 240.

After the turned workpiece has been removed and a new workpiece is placed in the machine, either manually or automatically, and the cross slide and carriage has been returned to their starting positions, either automatically or manually, and the chart has been restored to its starting position, either manually or automatically, the work cycle can again be initiated and new work piece operated. This also can be done either manually or automatically.

From the foregoing it will be appreciated that the present invention provides for the complete control of a machine tool such as a lathe by a chart on which a line as lines are drawn indicating the contour of the workpiece to be turned. These lines may be simple dark pencil or ink lines, or they may be colored or be placed on the chart with fluorescent ink or dyes so as to increase the illumination reflected to the photocells.

It is also within the purview of this invention to form the portions of the chart on opposite sides of each line with different colors so that the line is determined by the place where two different colors meet. The photocells are then selected so as to be sensitive to the proper color, or filters are employed with the photocells or with the sources of illumination so that it is by a change of color that the photocells become activated to cause the follower arms to take the proper movement or, as in the case of the first modification, to set up the influences which cause the chart to move laterally.

Further, it is contemplated that the cells may be illuminated by light coming through the chart rather than reflected from the upper face of the chart in which case the chart would be translucent or transparent to permit light to pass therethrough.

It will be understood that this invention is susceptible to modification in order to adapt it to different usages and conditions; and, accordingly, it is desired to comprehend such modifications within this invention as may fall within the scope of the appended claims.

I claim:

1. In a control unit for a machine tool having a work piece and tool supports relatively movable in two different directions; an elongated chart, a plurality of lines drawn longitudinally along the chart as color contrast thereon, means for moving the chart in the direction of its length, a photo electric scanning means pertaining to each line and including two photo-electric detectors sensitive to the lateral position of the pertaining line on the chart, and means sensitive to unbalanced actuation of the detectors for moving the said scanning means laterally so as to maintain a predetermined fixed position between the scanning means and the pertaining lines during movement of the said chart longitudinally, said movement of said scanning means operating means for controlling the relative movement of said workpiece and tool support and said last-named means including gears, amplifiers, reversing relays and motors.

2. In combination with a machine tool having a plurality of motors for actuating the machine tool; an elongated chart having a plurality of lines drawn longitudinally thereof, means for supporting said chart and for moving it longitudinally in the direction of its length, a photo electric scanning means adjacent the chart pertaining to each line and including two photo-electric detectors sensitive to the lateral position of the pertaining line on the chart, means connecting said motors with said detectors and sensitive to unbalanced actuation thereof by lateral movement of the pertaining lines relative thereto, means for drivingly connecting each of said scanning means to said motors, one to each for imparting upon said scanning means individual lateral movements to maintain a fixed relative position between the scanning means and the pertaining line, and means mechanically and drivingly interconnecting said last mentioned means with the said motors of the machine tool whereby to control the actuation of the motors in response to lateral movements of the said scanning means, and the said means interconnecting said scanning means with said motors of the machine tool including gears, amplifiers, and reversing relays.

3. In a machine tool; a spindle motor, a variable speed drive connecting the spindle motor with the spindle of the machine tool, a first motor associated with said variable speed drive for adjusting the ratio thereof, a lead screw motor, a second variable speed drive connecting the lead screw motor with the lead screw, a second motor pertaining to said second variable speed drive for adjusting the ratio thereof, a third motor connected with the cross slide of the machine tool and reversible for moving the cross slide toward and away from the work axis of the machine tool, an elongated chart having three lines drawn longitudinally thereof, means for supporting and moving said chart in the direction of its length, a photo electric scanning means adjacent the chart pertaining to each of said lines and including two photo-electric detectors sensitive to the lateral position of the pertaining lines on the chart, means connected with the scanning means sensitive to unbalanced actuation of the two detectors by lateral movements of the lines relative thereto for moving said scanning means laterally to maintain a fixed relative position between each of the scanning means and the lines pertaining thereto, and said last mentioned means being connected respectively with the first, second, and third motors for controlling the actuation thereof thereby to control the operation of said machine tool in response to lateral movements of said lines on the chart, and the means connecting said scanning means with said motors of the machine tool including gears, amplifiers, and reversing relays.

4. In a lathe; a spindle, a carriage, and a tool slide, a first motor for driving the spindle and a first variable speed transmission connecting the first motor with the spindle, there being a first reversible control motor pertaining to said variable speed transmission energizable for adjusting the drive ratio of the transmission, a second motor and a lead screw driven thereby for moving the carriage longitudinally of the work axis of the spindle and a second reversible control motor pertaining to the second variable speed transmission connecting the second motor with the lead screw and a second reversible control motor pertaining to said second variable speed transmission reversibly energizable for varying the drive ratio thereof, a third reversible control motor pertaining to the cross slide reversibly energizable for moving the cross slide on the carriage toward and away from the work axis of the lathe, an elongated chart having three lines drawn thereon in the longitudinal direction, means for supporting and moving said chart in the direction of its length, three photo electric scanning means adjacent said chart scanning said lines and including two photo-electric detectors sensitive to lateral displacements of the lines on the chart, means electrically connected with each of said scanning means for sensing unbalanced actuation thereof and being reversibly energizable, means for drivingly linking said three scanning means to said first, second and third motors respectively for laterally and individually moving each of said scanning means to maintain the scanning means and lines in predetermined fixed lateral positions relative to each other, said electrically connected means being connected in circuit with said control motors for the reversible energization thereof whereby the spindle speed and carriage speed and the direction of movement of the cross slide is under the control of said lines on the chart, and the means connecting said scanning means with said motors of the machine tool including gears, amplifiers and reversing relays.

5. In a lathe; a spindle, a carriage, and a tool slide, a first motor for driving the spindle and a first variable speed transmission connecting the first motor with the spindle, there being a first reversible control motor pertaining to said variable speed transmission energizable for adjusting the drive ratio of the transmission, a second motor and a lead screw driven thereby for moving the carriage longitudinally of the work axis of the spindle and a second reversible control motor pertaining to the second variable speed transmission connecting the second motor with the lead screw and a second reversible control motor pertaining to said second variable speed transmission reversibly energizable for varying the drive ratio thereof, a third reversible control motor pertaining to the cross slide reversibly energizable for moving the cross slide on the carriage toward and away from the work axis of the lathe, an elongated chart having three lines drawn thereon in the longitudinal direction, means for supporting and moving said chart in the direction of its length, three photo electric scanning means adjacent said chart scanning said lines and including two photo-electric detectors sensitive to lateral displacements of the lines on the chart, means electrically connected with each of said scanning means for sensing unbalanced actuation thereof and being reversibly energizable, means for drivingly linking said three scanning means to said first, second and third motors respectively for laterally and individually moving each of said scanning means to maintain the scanning means and lines in predetermined fixed lateral positions relative to each other, said electrically connected means being connected in circuit with said control motors for the reversible energization thereof whereby the spindle speed and carriage speed and the direction of movement of the cross slide is under the control of said lines on the chart, the said means for moving the chart longitudinally comprising drive apertures along the said chart and a pin wheel drive engaging said apertures, and a chart feed motor driving said pin wheel, and the means connecting said scanning means with said motors of the machine tool including gears, amplifiers and reversing relays.

6. In a lathe; a spindle, a carriage, and a tool slide, a first motor for driving the spindle and a first variable speed transmission connecting the first motor with the spindle, there being a first reversible control motor pertaining to said variable speed transmission energizable for adjusting the drive ratio of the transmission, a second motor and a lead screw driven thereby for moving the carriage longitudinally of the work axis of the spindle and a second reversible control motor pertaining to the second variable speed transmission connecting the second motor with the lead screw and a second reversible control motor pertaining to said second variable speed transmission reversibly energizable for varying the drive ratio thereof, a third reversible control motor pertaining to the cross slide reversibly energizable for moving the cross slide on the carriage toward and away from the work axis of the lathe, an elongated chart having three lines drawn thereon in the longitudinal direction, means for supporting and moving said chart in the direction of its length, three photo electric scanning means adjacent said chart scanning said lines and sensitive to lateral displacements of the lines on the chart, means electrically connected with each of said scanning means for sensing unbalanced actuation thereof and being reversibly energizable, means for drivingly linking said three scanning means to said first, second and third motors respectively for laterally and individually moving each of said scanning means to maintain the scanning means and lines in predetermined fixed lateral positions relative to each other, said electrically connected means being connected in circuit with said control motors for the reversible energization thereof whereby the spindle speed and carriage speed and the direction of movement of the cross slide is under the control of said lines on the chart, the said means for moving the chart longitudinally comprising drive apertures along the said chart and a pin wheel drive engaging said apertures, and a chart feed motor driving said pin wheel, said chart feed motor being selectively reversible for returning said chart to its original position upon feeding of the chart in advancing direction a predetermined amount, and the means connecting said scanning means with said motors of the machine tool including gears, amplifiers and reversing relays.

7. The combination of a lathe; of a spindle, a carriage and a tool slide, a first motor for driving the spindle and a first variable speed transmission connecting the first motor with the spindle, a first control motor reversibly energizable for adjusting said first transmission to regulate the spindle speed, a lead screw pertaining to the carriage and a second motor for driving the lead screw and a second variable speed transmission connecting the second motor with the lead screw, a second control motor reversibly energizable for varying the ratio of said second transmission to vary the lead screw speed and, therefore, the speed of movement of the carriage, a third control motor connected with the tool slide reversibly energizable for moving the tool slide respectively toward or away from the work axis of the spindle, an elongated chart, means supporting said chart for movement at a uniform rate of speed in the direction of its length, a plurality of lines drawn on said chart in the longitudinal direction thereof, photo electric scanning means for each line movably mounted adjacent the chart and including two photo-electric detectors sensitive to the lateral position of the pertaining lines on the chart, means connected with the scanning means sensitive to unbalanced actuation of the scanning means by lateral movements of the lines on the chart relative thereto, and circuit means interconnecting said last mentioned means with the respective said control motors for controlling the energization of said motors in response to the actuation of said scanning means, and each of said control motors having a connection with the scanning means pertaining thereto for adjustment of the scanning means in response to energization of the control motors whereby the scanning means tend to be maintained in a fixed relative position with regard to the pertaining lines on the chart and whereby the entire operation of the lathe is under the control of the lines drawn on the chart, and the means connecting said scanning means with said motors of the machine tool including gears, amplifiers and reversing relays.

References Cited in the file of this patent

UNITED STATES PATENTS

| | | |
|---|---|---|
| 2,125,074 | Long | July 26, 1938 |
| 2,226,677 | Vikhman | Dec. 31, 1940 |
| 2,537,770 | Livingston et al. | Jan. 9, 1951 |
| 2,777,069 | Saemen | Jan. 8, 1957 |
| 2,837,046 | Carson et al. | June 3, 1958 |
| 2,933,612 | Cheverton et al. | Apr. 19, 1960 |
| 2,961,548 | Prell | Nov. 22, 1960 |
| 2,989,639 | Dulebohn et al. | June 20, 1961 |
| 3,069,550 | Neamder | Dec. 18, 1962 |
| 3,105,907 | Colten et al. | Oct. 1, 1963 |

FOREIGN PATENTS

| | | |
|---|---|---|
| 1,111,229 | France | Feb. 23, 1956 |
| 1,037,231 | Germany | Aug. 31, 1958 |